United States Patent [19]

Rigdon et al.

[11] Patent Number: 5,638,560

[45] Date of Patent: Jun. 17, 1997

[54] SLEEPER BED FOR OVER-THE-ROAD TRACTORS

[76] Inventors: Charles V. Rigdon, Hwy. 60, MP 54 P.O. Box 276; David A. Prefling, Hwy. 60, MP 54 P.O. Box 100, both of Salome, Ariz. 85348

[21] Appl. No.: 578,472

[22] Filed: Dec. 26, 1995

[51] Int. Cl.⁶ .............................. B60P 3/38; B62D 33/06; A47C 17/80; A47C 17/48
[52] U.S. Cl. ................................. 5/118; 5/136; 296/190
[58] Field of Search .................. 5/118, 94, 136, 5/162, 309; 296/190

[56] References Cited

U.S. PATENT DOCUMENTS

| | | | |
|---|---|---|---|
| 3,371,359 | 3/1968 | Dome | 5/118 |
| 3,680,156 | 8/1972 | McKee et al. | 5/309 |
| 4,144,601 | 3/1979 | Anderson et al. | 5/118 |
| 4,196,483 | 4/1980 | Lefler et al. | 5/118 |
| 4,497,078 | 2/1985 | Vogel et al. | 5/118 |
| 4,541,134 | 9/1985 | Black et al. | 5/118 |
| 4,664,438 | 5/1987 | Crepaldi | 5/118 |
| 4,979,248 | 12/1990 | Kelley | 5/118 |
| 5,218,728 | 6/1993 | Lloyd et al. | 5/118 |
| 5,432,963 | 7/1995 | Coral et al. | 5/118 |

Primary Examiner—Alexander Grosz
Attorney, Agent, or Firm—Martin L. Stoneman

[57] ABSTRACT

This invention provides a vibration-free sleeper bed for over-the-road tractors. More particularly, this invention concerns a sleeper compartment device which provides a system whereby an off-duty driver may sleep in a vibration-free bed which remains at a preselected height, even during the over-the-road operation of the tractor. This is accomplished by providing a vertically-slidable support for the bed and using an air spring alongside a shock absorber to damp vibrations. Also, the bed itself is mounted on vibration-damping hard rubber mounts.

17 Claims, 4 Drawing Sheets

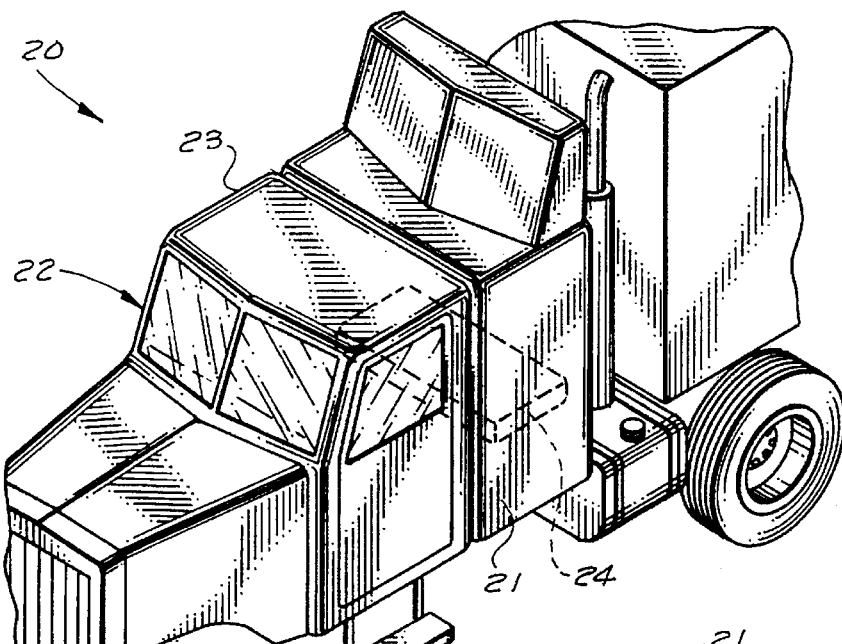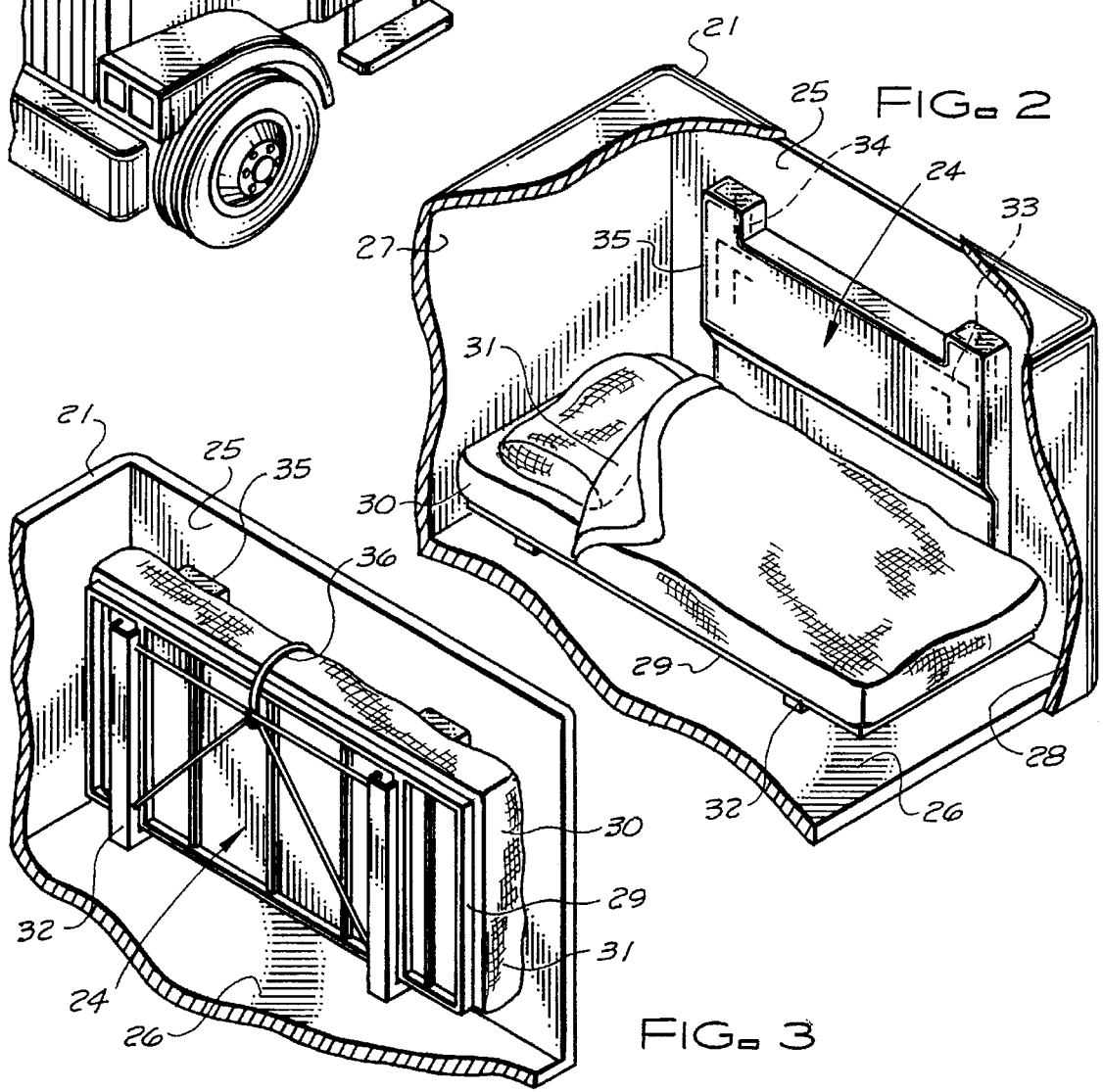

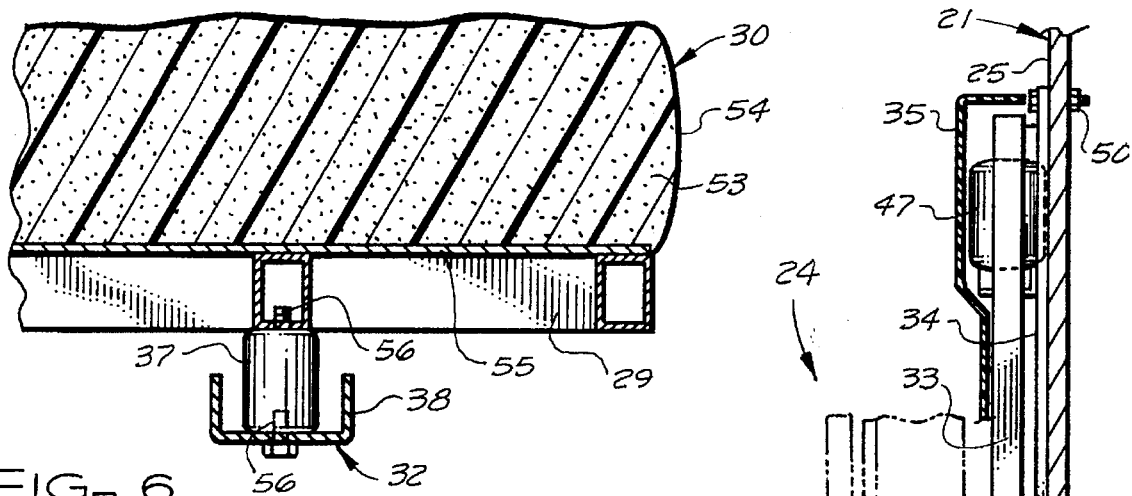
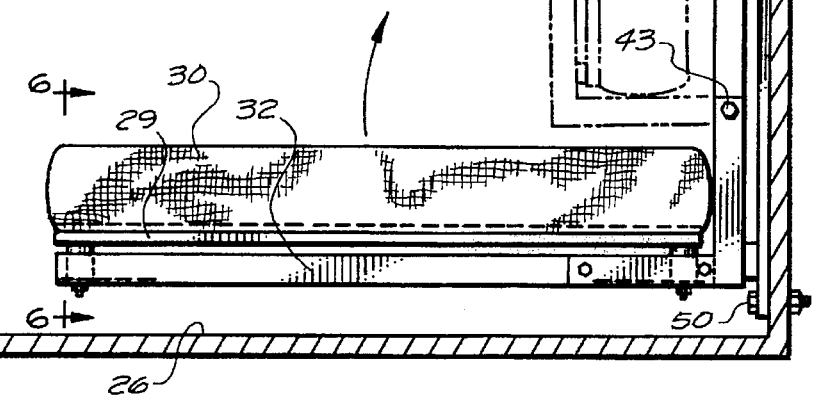
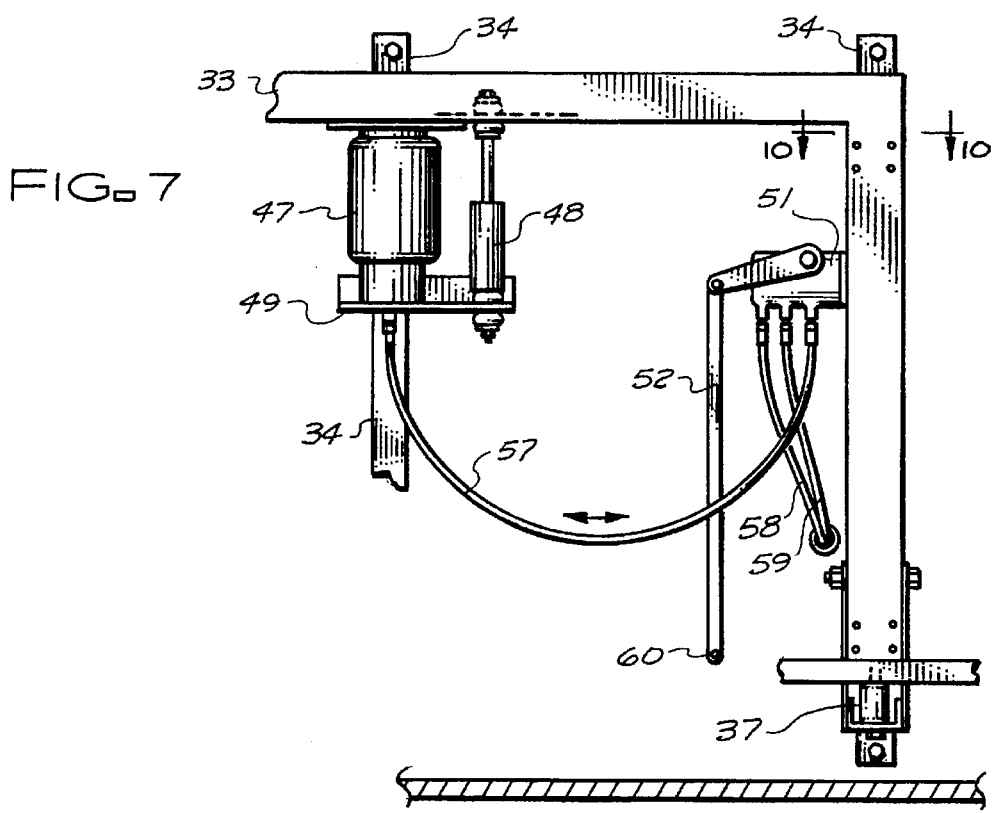

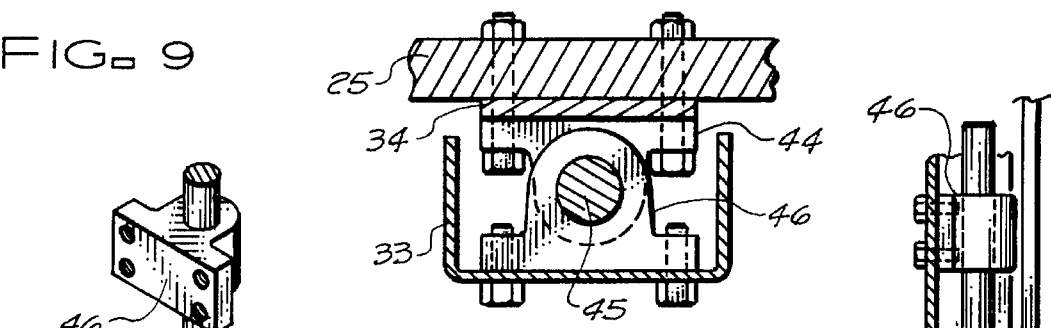
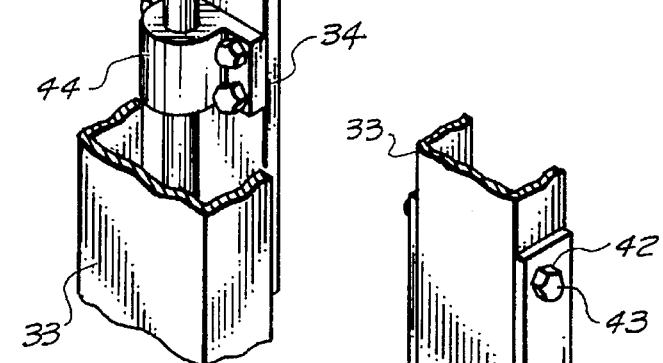
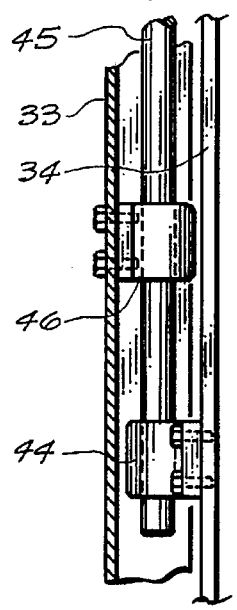
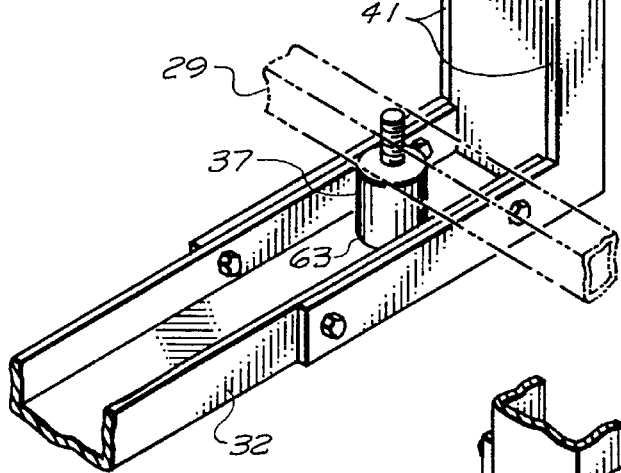
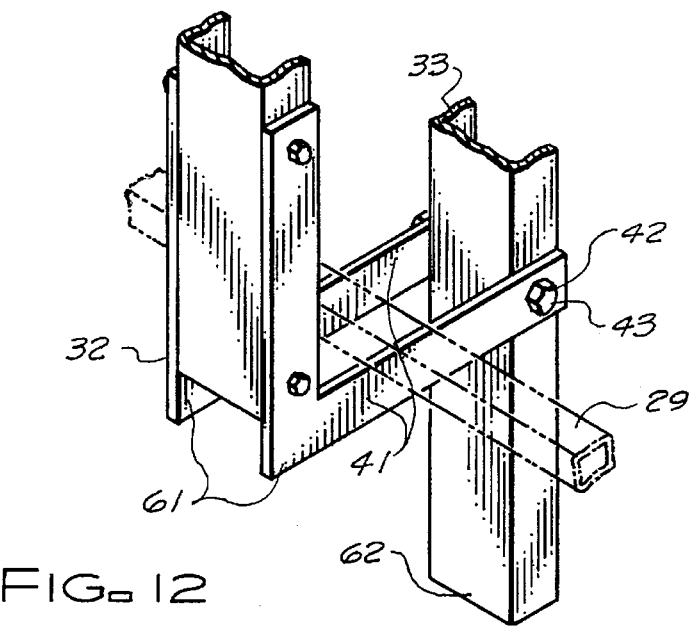

SLEEPER BED FOR OVER-THE-ROAD TRACTORS

BACKGROUND OF THE INVENTION

1. Field of the Invention

This invention relates to providing an improved sleeper bed for over-the-road tractors. More particularly, this invention concerns a sleeper compartment device which provides a system whereby an off-duty driver may sleep in a vibration-free bed, even during the over-the-road operation of the tractor.

2. Description of the Prior Art

Typically, within the over-the-road trucking industry, an onboard sleeping location is provided for an over-the-road tractor-trailer truck driver. Long hauls are regulated by laws in regard to the number of hours a driver is allowed to operate the truck between rest periods. These regulations are to help deter overly tired and unalert drivers from operating these large vehicles in an unsafe manner. A behind-the-cab sleeping compartment with a bed is commonly used by truckers for providing a convenient location for these rest or sleep periods. Such sleeping compartments are frequently outfitted to provide comfortable quarters and are more desirable than motel rooms in many ways. One very desirable feature is that they travel with the trucker and are always available. Attesting to the popularity of these sleeping compartments is their common usage on most over-the-highway rigs.

With the costly investment in large trucks, and expense of truck shipping in general, along with scheduling demands, it is only obvious that these trucks remain in operation as many hours a day as possible. Therefore it is common practice that, on long hauls, two drivers accompany each other, one driver operating the truck while the other rests or sleeps within the sleeping compartment. For convenience, the rear of the cab normally contains an opening through to the sleeper compartment to allow access at all times. Commonly installed in over-the-road truck tractors is a driver's seat which includes comfort features such as suspension systems for the purpose of minimizing the rough riding characteristics of these trucks. The sleeping, off-duty driver also has the same, or greater, need for comfort, while sleeping during such over-the-road rough riding, which the conventional sleeper bed does not provide. Even when a typical over-the-road truck is stopped, the vibration characteristics of the typical diesel engine in such truck continues to create large vibrations which may interfere with the rest of the sleeping driver.

OBJECTS OF THE INVENTION

A primary object of the present invention is to fulfill the above-mentioned needs by the provision of a vibration-free sleeper bed for over-the-road tractors. A further primary object of the present invention is to provide an improved over-the-road tractor with a sleeper compartment having a vibration-free sleeper bed. In addition, it is a primary object of this invention to provide such a device which is efficient and inexpensive. Other objects of this invention will become apparent with reference to the following invention descriptions.

SUMMARY OF THE INVENTION

According to a preferred embodiment of the present invention, there is provided an improved over-the-road tractor, of the type including a tractor cab, comprising, in combination: located rearwardly from such tractor cab, a sleeper compartment; first frame means attached to such sleeper compartment; second frame means for holding a bed; support means for supporting such second frame means in vertically-sliding relationship with such first frame means; and damping means for insulating such second frame means from the vertical vibrating of such sleeper compartment during operation of such tractor. Additionally, this invention provides such a tractor wherein such support means comprises: vertical rod means attached to such first frame means; and mounted on such vertical rod means, bearing means vertically movable along such vertical rod means and attached to such second frame means.

Yet further, this invention provides such a tractor further comprising air spring means attached between such first frame means and such second frame means. Even further, there is provided such a tractor further comprising control valve means for adjusting air supply to such air spring means to adjust such second frame means to a selected height; and, further, wherein such damping means comprises such air spring; and, further, wherein such damping means further comprises shock absorber means between such first frame means and such second frame means.

Yet additionally, according to a preferred embodiment of the present invention, there is provided a such tractor further comprising: bed mounting means; normally-horizontal bed frame means supported on such second frame by such bed mounting means; wherein such bed mounting means comprises hard-rubber-like means for damping vibration. Even further provided by this invention is a such tractor wherein such support means comprises: vertical rod means attached to such first frame means; and, mounted on such vertical rod means, bearing means vertically movable along such vertical rod means and attached to such second frame means. Additionally, this invention provides, according to a preferred embodiment, a such tractor wherein such second frame means comprises hinge means for folding such normally-horizontal bed frame means into a vertical position.

Yet further, according to a preferred embodiment of the present invention, there is provided an improved over-the-road tractor, of the type including a tractor cab, comprising, in combination: bed-support means for supporting a bed at a selectable height above a floor of such over-the-road tractor; and vibration-insulation means for insulating such bed from vibration during operation of such over-the road tractor. Additionally provided is a such tractor wherein such bed-support means comprises air spring means; and, further, wherein such vibration-insulation means comprises air spring means, shock absorber means and hard-rubber-like means.

Yet additionally, according to a preferred embodiment of the present invention, there is provided a sleeper bed device for use in a sleeper compartment of an over-the-road tractor, such sleeper compartment having a compartment floor and an essentially-vertical compartment rear wall, such sleeper bed device comprising, in combination: first means for supporting a bed at a selected height above such compartment floor; second means for reducing vertical vibration in such first means. Further, there is provided a such sleeper bed device further comprising: third means for adjusting such height of such first means; wherein such third means comprises air spring means attached between such compartment rear wall and such first means.

And, further, this invention provides a such sleeper bed device wherein such third means further comprises control valve means for adjusting air supply to such air spring means to adjust such height of such first means; and, further, wherein such bed is mounted on hard-rubber-like supports; and, further, wherein such second means comprises air spring means; and, further, wherein such second means comprises shock absorber means. Even further, there is provided a such sleeper bed device further comprising: vertical rod means attached to such sleeper compartment; and, mounted on such vertical rod means, bearing means vertically movable along such vertical rod means and attached to such bed. Yet further, according to this invention, there is provided a such sleeper bed device wherein such first means comprises hinge means for folding such bed up against and parallel to such compartment rear wall.

BRIEF DESCRIPTION OF THE DRAWINGS

FIG. 1 is a perspective view illustrating an over-the-road tractor with a sleeper compartment and the location of a bed device installed within.

FIG. 2 is a cut-away perspective view of a sleeper compartment and located within is a preferred embodiment of a sleeper bed device of the present invention in position for use.

FIG. 3 is a cut-away perspective view of a sleeper compartment and located within is a preferred embodiment of a sleeper bed device in a stowed position.

FIG. 5 is a left end elevation view of the preferred embodiment of the sleeper bed device of the present invention, and showing its attachment in a sleeper compartment.

FIG. 6 is a partial cross-sectional view through the section 6—6 of FIG. 5.

FIG. 7 is a partial elevation view illustrating the suspension and control means of the present invention.

FIG. 8 is a partial cross-sectional elevation view of the preferred vertically-sliding support means of the present invention.

FIG. 9 is a partial perspective view of the structure of FIG. 8.

FIG. 10 is a partial cross-sectional plan view of the structure of FIG. 8.

FIG. 11 is a partial perspective view of the hinge means of the present invention with the bed in its use position.

FIG. 12 is a partial perspective view of the hinge means of the present invention with the bed in its stow position.

DETAILED DESCRIPTION OF A PREFERRED EMBODIMENT AND THE BEST MODE OF PRACTICE

Figure 4:
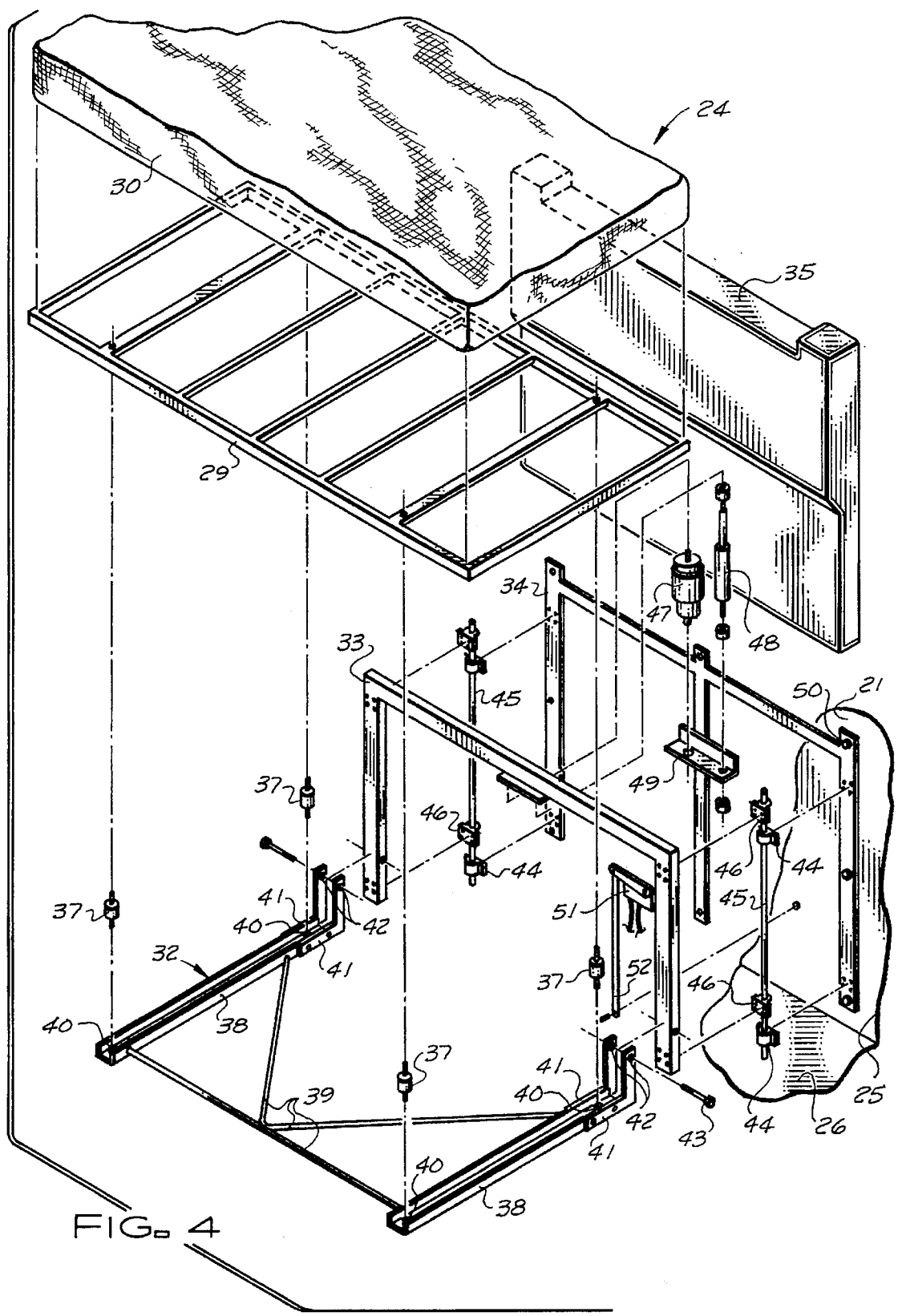
FIG. 4 is an exploded perspective view detailing a preferred embodiment of a sleeper bed device of the present invention.

FIG. 1 is a perspective view illustrating a common over-the-road-truck tractor cab 20 (of the type common in tractors for hauling trailers) with sleeper compartment 21 mounted on the tractor 22 and located to the rear side of the cab driving compartment 23. Installed within the sleeper compartment 21, and illustrated with hidden lines, is the position of the preferred embodiment of a sleeper bed device 24.

Illustrated by FIG. 2 is a cut-away perspective view of a sleeper compartment 21 and located within is the preferred embodiment of a sleeper bed device 24 in the use position. The sleeper bed device 24 is preferably securely mounted to the rear wall 25 of the sleeper compartment 21 and at no times in contact with the floor 26, the right wall 27 or the left wall 28. The actual bed, consisting bed frame means embodied by of the bed frame 29, mattress 30 and any desirable bedding 31, is supported by frame means embodied by normally-horizontal frame portion 32 and vertically-movable frame portions 33. And frame portion 32, while not attached to the floor 26, is supported by the vertically-movable frame portion 33 which is connected movably to other frame means embodied by the fixed frame structure 34 which in turn is secured to the rear wall 25. The vertically-movable frame portion 33 and the fixed frame structure 34 are not generally visible since they are located behind a cover 35. The cover 35 serves as a decorative feature as well as shielding the mechanism behind. The sleeper bed device 24 as shown in FIG. 2 is in the sleeping position and cushions vibrations and road shocks by utilizing vibration isolators and a pneumatic suspension system (as hereinafter more particularly described). The support means of the present invention is embodied by the suspension system to be further described, which provides for the bed (i.e., bed frame 29 and mattress 30) to "float" with gentle, softened motions in response to the harsh motions of the sleeper compartment 21 and truck tractor.

FIG. 3 is a cut-away perspective view showing a portion of the sleeper compartment 21 and located within is the preferred embodiment of the sleeper bed device 24 illustrated in stowed position. The frame portion 32, which holds the bed frame 29 and mattress 30 with bedding 31, is pivotally attached (by hinge means) to the frame portion 33 (not shown) and may be raised to a vertical position and secured to the rear wall 25 with a retention strap 36. When stowed, the mattress 30 and bedding 31 are positioned against the cover 35 conserving as much remaining space within the sleeper compartment 21 as possible. Since the sleeper bed device 24 is mounted to the rear wall 25 only, no disconnection from the floor 26 is required.

The components of the preferred embodiment of the sleeper bed device 24 are illustrated by exploded perspective view in FIG. 4. The mattress 30 along with a bed frame 29 for support, are attached to the frame portion 32 at four locations with bed mounting means embodied by vibration-damping hard-rubber or hard-rubber-type vibration isolator mountings 37. The mountings 37, being constructed of hard-rubber-type material, provide a resilient connection between the bed frame 29 and frame portion 32. This resilient connection at the mountings 37 gives further isolation to the bed from jerking, vibrating and shocks from the truck. Construction and attachment details of the mattress 30, bed frame 29, mountings 37 and frame portion 32 are further discussed with the discussion of FIGS. 5, 6 and 11.

The frame portion 32 is of metal welded construction and consists of two legs 38 connected with braces 39. The legs 38 are of channel-form cross-section and have holes 40 to receive attachment of the mountings 37. At the rear ends of the legs 38 are hinge plates 41 for pivotally connecting legs 38 to the vertically-movable frame portion 33, this connection being made at holes 42 with pivot bolts 43. This pivot attachment is further described in respect of FIGS. 11 and 12. The vertically-movable frame portion 33 is attached indirectly (and freely movably up and down) to the fixed frame structure 34 with rod anchors 44, shafts or rods 45 and bearings 46. This attachment is detailed in FIGS. 8, 9 and 10. The vertically-movable frame portion 33 and frame portion 32 are supported above and not in contact with the floor 26 of the sleeper compartment 21.

While free to move up and down, the vertically-movable frame portion 33 holding frame portion 32 is supported vertically solely by air spring means embodied by an air spring 47 (preferably a Firestone (TM) Air Spring). Controlled air flow positions the exact height at which the air spring 47 supports the mounting suspension unit 33 depending upon the amount of air in the stretchable rubber bag comprising the air spring 47. At all times the frame portion 32 is elevated above and not in contact with the floor 26 of the sleeper compartment 21. Also, the air spring 47, being of flexible rubber construction and containing air (which is compressible and not solid) provides (in well known ways) a cushioning and a vibration and shock absorbing support.

Additionally, a conventional shock absorber 48 is mounted alongside the air spring 47 to further control motion from external shock forces and to dampen the spring-like, bouncing motion that the air spring 47, used alone, might allow. The air spring means 47 and shock absorber means 48, comprising the damping means of this invention operable between the sleeper compartment 21 and the movable frame portions 32 and 33, are in turn supported by, and attached to, the fixed frame structure 34 at the support shelf 49 location. The fixed frame structure 34 is securely bolted to the rear wall 25 with bolts Pressurized air is supplied from the truck's air system and is modulated by control valve means embodied by control valve 51 to vary the air pressure provided to the air spring 47. The control valve 51 is rigidly mounted to the vertically-movable frame portion 33, moves up/down with such, but varies the pneumatic output with input from a control linkage 52 which is attached to the rear wall 25.

In operation, when the tractor transmits a shock wave to the sleeper compartment 21, the sleeper bed device 24 responds with a bounce due to its soft cushion support by the air spring 47. The bounce is counteracted and opposed by a varying of air pressure to air spring 47. This varying of air pressure occurs as the control valve 51 (also bouncing) is actuated by the rigidly attached control linkage 52. The combinatorial effect of all three types of damping devices (i.e., the air spring 47, the shock absorber 48, and the vibration-isolating mountings 37), as provided by this invention, provides an essentially vibration-free bed, even in over-the-road travel.

Also shown is cover 35 which shields the moving portion of the sleeper bed device 24. Cover 35 is of molded plastic or other similar material whereas all the structural components of the sleeper bed device 24 are of welded and bolted steel or aluminum construction or other suitable metals.

FIG. 5 shows in a left end elevation view the preferred embodiment of the sleeper bed device 24 and its mounting attachment (of fixed frame structure 34 to the sleeper compartment 21) at the rear wall 25 with bolts 50. The sleeper bed device 24 may be installed at any convenient height above the floor 26 providing it does not contact the floor 26 at it's lowest point of movement. The mattress 30, bed frame 29 and frame portion 32 are shown in the down (or use) position and by broken lines (partial), in the up (or stowed) position, pivoting about pivot bolts 43. The vertically-movable frame portion 33, the air spring 47 and other components are shielded from the occupant by the cover 35 (shown in cross-section). The fixed frame structure 34 is affixed to and stationary with respect to the rear wall 25 whereas the "floating" components of sleeper bed device 24 move in response to shock and vibration.

FIG. 6 shows in cross-section (through the section 6—6 of FIG. 5) mattress 30, bed frame 29, leg 38 of frame portion 32, and their attachment with one of the four mountings 37. The mattress 30 of the preferred embodiment is a foam cushion 53 and a cover 54, both attached to a plywood bottom 55. The plywood bottom 55 provides a solid base for attachment to the bed frame 29 (in well known ways) with screws or bolts. The bed frame 29 is constructed of square or rectangular tubing with a perimeter and cross braces (as shown in FIG. 4) to provide ample support to the mattress 30. The bed frame 29 is bolted to the top end of the four mountings 37 which are in turn bolted at their bottom end to the channel shape of the legs 38. The mountings 37 are preferably of solid hard rubber with a fastener attachment 56 molded into each end. The size, shape and diameter of mountings 37 may be selected in well known ways to provide the most ideal strength and damping qualities.

FIG. 7 is a partial elevation view illustrating the bed-support means of the present invention for supporting the bed at a selectable height above the floor of the over-the-road tractor, all as embodied by the described suspension and control means of the present invention. The vertically-movable frame portion 33 is shown in location in front of the fixed frame structure 34 supported by the air spring 47 which is attached to the top of the support shelf 49 (which is essentially a part of fixed frame structure 34). Also, the shock absorber 48 is connected to and between the fixed frame structure 34 and the mounting suspension unit 33, all as shown. Air is supplied to the air spring 47 by the control valve 51 through air line 57. Varying air supply provides support and motion in response to truck motion (and also additional air/support if a more weighty sleeper lies in the bed). Supply line 58 and discharge line 59 pass through the rear wall 25 and connect to the truck's air system. Since the control linkage 52 is attached at one end 60 to the rear wall 25, relative movement between the rear wall 25 and the control valve 51 (attached to the vertically-movable frame portion 33) actuates the control valve 51 to provide varying air supply to the air spring 47 resulting in desired damping-action assistance and in maintenance of a preferred bed height. The "floating" action derived from the responsive motion of the vibration-insulation means of this invention (for insulating the bed from vibration during operation of the over-the road tractor), embodied by the air spring 47 combined with the damping of the shock absorber 48 combined with the damping action of the mountings 37, support the bed frame 29 and bed in a comfortable and essentially vibration-free manner.

FIG. 8 is an elevation detail view showing the vertically-movable frame portion 33 and the method of attachment to the fixed frame structure 34. The detail shown is typical for both vertical legs of both frame structures (as shown best in FIG. 4), one leg per frame on each side of the sleeper bed device 24. Bolted to each vertical side leg of the fixed frame structure 34 are two rod anchors 44 which hold and firmly support vertical rod means embodied by a round rod 45. Rod 45 extends a distance above the top rod anchor 44. Located also on each rod 45 are bearing means embodied by two bearings 46, which are free to move up an down on rod 45. A bearing 46 is located (on each rod 45) above each rod anchor 44. The two channel shaped vertical members (one on each side) of the vertically-movable frame portion 33 are bolted to the four bearings 46 (as shown) allowing free movement up and down with respect to the fixed frame structure 34.

To further clarify this mounting, in FIG. 9 is shown in perspective a portion of the fixed frame structure 34 with a rod anchor 44 and rod 45 solidly attached. Above rod anchor 44 and free to slide up and down on rod 45 is shown a bearing 46. Also shown is a portion of the vertically-movable frame portion 33.

FIG. 10 is a cross section plan view of the attachment of the vertically-movable frame portion 33 to the fixed frame structure 34 as is shown in FIG. 8 and typical on both vertical sides of the sleeper bed device 24. Shown bolted to the vertically-movable frame portion 33 is a bearing 46 which slides freely up and down on the round rod 45. Attaching the rod 45 firmly to the fixed frame structure 34 is shown a rod anchor 40. Also, optionally, as shown in FIG. 10, since the rod anchor 44 is bolted to the fixed frame structure 34, the same bolts may also be used to secure the assembly to the rear wall 25 as shown.

FIG. 11 is a partial perspective view of the hinge means of the present invention, embodied by hinge plate 41 and pivot bolt 43, with the bed in its normally-used horizontal position; and FIG. 12 is a partial perspective view of the hinge means of the present invention with the bed in its stowed vertical position. It is noted that the bottom portions 62 of vertically-movable frame portions 33 should be long enough to act as a down stop when impinged by the corner portions 61 of frame portions 32 so that the bed supported by frame portions 32, when pivoted back to horizontal (on pivot bolts 43) does not go past the horizontal but is stopped by impingement upon bottom portions 62 of frame portions 33.

It is noted, with particular reference to FIG. 11, that some further benefit in minimizing horizontal bed vibration when the truck is accelerated or decelerated may be obtained by the alternative embodiment of not attaching directly to frame portions 32 the bottom portions (as at 63) of vibration-isolating mountings 37. Rather, wheels may be mounted to the bottoms of mountings 37; and such wheels may roll longitudinally in the direction of and along the channel of frame portions 32. Also, for this alternative, compression springs are mounted to frame portions 32, operable along such channel direction, impinging on each side of mounting 37 so as to further reduce such horizontal vibration to the bed frame 29. Although applicant has described applicant's preferred embodiments of this invention, it will be understood that the broadest scope of this invention also includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. An improved over-the-road tractor, of the type including a tractor cab, comprising, in combination:
   a. located rearwardly from said tractor cab, a sleeper compartment including a generally vertical wall;
   b. first frame means attached to said wall of said sleeper compartment;
   c. second frame means for holding a bed;
   d. support means for supporting said second frame means in vertically-sliding relationship with said first frame means; and
   e. damping means for insulating said second frame means from the vertical vibrating of said sleeper compartment during operation of said tractor.

2. The improved over-the-road tractor of claim 1 wherein said support means comprises:
   a. vertical rod means attached to said first frame means; and
   b. mounted on said vertical rod means, bearing means vertically movable along said vertical rod means and attached to said second frame means.

3. The improved over-the-road tractor of claim 1, further comprising:
   a. air spring means attached between said first frame means and said second frame means.

4. The improved over-the-road tractor of claim 3, further comprising:
   a. control valve means for adjusting air supply to said air spring means to adjust said second frame means to a selected height.

5. The improved over-the-road tractor of claim 4 wherein said damping means comprises said air spring.

6. The improved over-the-road tractor of claim 5 wherein said damping means further comprises shock absorber means between said first frame means and said second frame means.

7. The improved over-the-road tractor of claim 6 further comprising:
   a. bed mounting means;
   b. normally-horizontal bed frame means supported on said second frame by said bed mounting means;
   c. wherein said bed mounting means comprises hard-rubber-like means for damping vibration.

8. The improved over-the-road tractor of claim 7 wherein said support means comprises:
   a. vertical rod means attached to said first frame means; and
   b. mounted on said vertical rod means, bearing means vertically movable along said vertical rod means and attached to said second frame means.

9. The improved over-the-road tractor of claim 1 wherein said second frame means comprises hinge means for folding said normally-horizontal bed frame means into a vertical position.

10. A sleeper bed device for use in a sleeper compartment of an over-the-road tractor, said sleeper compartment having a compartment floor and an essentially-vertical compartment rear wall, said sleeper bed device comprising, in combination:
    a. first means for supporting a bed at a selected height above said compartment floor;
    b. second means for reducing vertical vibration in said first means;
    c. said first means comprising
       i. first attachment means for attaching to said wall and
       ii. second attachment means for attaching to said bed;
    d. said first and second attachment means being in a vertically-sliding relationship.

11. The sleeper bed device of claim 10, further comprising:
    a. third means for adjusting said height of said bed;
    b. wherein said third means comprises air spring means.

12. The sleeper bed device of claim 11 wherein said third means further comprises control valve means for adjusting air supply to said air spring means to adjust said height of said bed.

13. The sleeper bed device of claim 10 wherein said bed is mounted on hard-rubber-like supports.

14. The sleeper bed device of claim 13 wherein said second means comprised shock absorber means.

15. The sleeper bed device of claim 14 further comprising:
    a. vertical rod means attached to said sleeper compartment; and
    b. mounted on said vertical rod means, bearing means vertically movable along said vertical rod means and attached to said bed.

16. The sleeper bed device of claim 10 wherein said first means comprises hinge means for folding said bed up against and parallel to said compartment rear wall.

17. An improved over-the-road tractor, of the type including a tractor cab, comprising, in combination:
   a. located rearwardly from said tractor cab, a sleeper compartment including a generally vertical frame portion;
   b. first frame means attached to said frame portion of said sleeper compartment;
   c. second frame means for holding a bed;
   d. support means for supporting said second frame means in vertically-sliding relationship with said first frame means; and
   e. damping means for insulating said second frame means from the vertical vibrating of said sleeper compartment during operation of said tractor.

* * * * *